(12) United States Patent
Chiang et al.

(10) Patent No.: US 9,036,747 B2
(45) Date of Patent: May 19, 2015

(54) WIRELESS COMMUNICATION RECEIVER WITH PHASE NOISE ESTIMATION AND PHASE NOISE COMPENSATION PERFORMED AFTER CHANNEL ESTIMATION, AND RELATED WIRELESS COMMUNICATION RECEIVING METHOD AND PHASE NOISE COMPENSATION APPARATUS

(75) Inventors: Chia-Hsien Chiang, Taipei (TW);
Ching-Shyang Maa, Tainan (TW);
Chih-Hsiu Lin, Yilan County (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 465 days.

(21) Appl. No.: 13/293,084

(22) Filed: Nov. 9, 2011

(65) Prior Publication Data

US 2013/0114661 A1 May 9, 2013

(51) Int. Cl.
*H04B 1/10* (2006.01)
*H04L 25/02* (2006.01)
*H04L 27/26* (2006.01)
*H04L 27/00* (2006.01)

(52) U.S. Cl.
CPC ........ *H04L 25/0202* (2013.01); *H04L 27/2695* (2013.01); *H04L 27/2657* (2013.01); *H04L 2027/0026* (2013.01)

(58) Field of Classification Search
CPC ................... H04L 2027/0067; H04L 27/2672; H04L 27/2691; H04L 27/2695; H04L 2027/0026; H04L 27/2657; H04L 27/2647
USPC ........... 375/260, 326, 340, 346; 370/208, 210
See application file for complete search history.

(56) References Cited

U.S. PATENT DOCUMENTS

| 6,603,811 | B1 * | 8/2003 | Dobson et al. | 375/232 |
|---|---|---|---|---|
| 7,058,002 | B1 * | 6/2006 | Kumagai et al. | 370/203 |
| 7,283,598 | B2 * | 10/2007 | Akita et al. | 375/316 |
| 7,643,405 | B1 * | 1/2010 | Narasimhan | 370/208 |
| 7,733,993 | B2 | 6/2010 | Lindh | |

(Continued)

FOREIGN PATENT DOCUMENTS

| EP | 1 814 276 A1 | 8/2007 |
|---|---|---|
| FR | 2832886 A1 | 5/2003 |

OTHER PUBLICATIONS

Steffen Bittner, Ernesto Zimmermann and Gerhard Fettweis, Iterative Phase Noise Mitigation in MIMO-OFDM Systems with Pilot Aided Channel Estimation, pp. 1087-1091, ISBN: 978-1-4244-0263-2, XP031147573, 2007 IEEE.

(Continued)

*Primary Examiner* — Sophia Vlahos
(74) *Attorney, Agent, or Firm* — Winston Hsu; Scott Margo

(57) ABSTRACT

A wireless communication receiver includes a first signal processing block, a phase noise compensation apparatus, and a second signal processing block. The first signal processing block is arranged for generating a first processed output by processing a reception signal, wherein the first signal processing block includes a channel estimation unit arranged for performing channel estimation. The phase noise compensation apparatus is arranged for receiving the first processed output and generating a second processed output by performing phase noise compensation according to the received first processed output. The second signal processing block is arranged for receiving the second processed output and processing the received second processed output.

23 Claims, 3 Drawing Sheets

(56) References Cited

U.S. PATENT DOCUMENTS

| | | |
|---|---|---|
| 8,094,732 B2 * | 1/2012 | Jahan et al. ............. 375/260 |
| 8,457,252 B2 * | 6/2013 | Liu ............. 375/316 |
| 2004/0021795 A1 | 2/2004 | Kim |
| 2006/0182015 A1 * | 8/2006 | Kim ............. 370/203 |
| 2006/0251198 A1 | 11/2006 | Ma et al. |
| 2007/0041456 A1 * | 2/2007 | Jahan et al. ............. 375/260 |
| 2008/0008258 A1 * | 1/2008 | Tanabe ............. 375/267 |
| 2008/0159424 A1 * | 7/2008 | Hoo et al. ............. 375/260 |
| 2009/0279421 A1 * | 11/2009 | Wang et al. ............. 370/210 |
| 2010/0238992 A1 * | 9/2010 | Yamagishi ............. 375/232 |

OTHER PUBLICATIONS

Stott, "The effects of phase noise in COFDM", BBBC Research &Development, pp. 1-22, EBU Technical Review, Summer 1998.

Armada, "Understanding the Effects of Phase Noise in Orthogonal Frequency Division Multiplexing (OFDM)", pp. 153-159, IEEE Transactions on Broadcasting, vol. 47, No. 2, Jun. 2001.

* cited by examiner

WIRELESS COMMUNICATION RECEIVER WITH PHASE NOISE ESTIMATION AND PHASE NOISE COMPENSATION PERFORMED AFTER CHANNEL ESTIMATION, AND RELATED WIRELESS COMMUNICATION RECEIVING METHOD AND PHASE NOISE COMPENSATION APPARATUS

BACKGROUND

The disclosed embodiments of the present invention relate to wireless communication signal reception, and more particularly, to a wireless communication receiver with phase noise estimation and phase noise compensation performed after channel estimation, and related wireless communication receiving method and phase noise compensation apparatus.

An orthogonal frequency division multiplexing (OFDM) technique distributes the data over a large number of sub-carriers that are spaced apart at defined frequencies. This spacing provides the orthogonality of the OFDM approach, and prevents the demodulators from seeing frequencies other than their own. The benefits of OFDM include high spectral efficiency, resiliency to radio-frequency (RF) interference, and lower multipath distortion. To transmit the signal up to the RF at the transmitter and to shift the received RF signal down to the intermediate-frequency (IF)/baseband at the receiver, practical oscillators are used. However, the practical oscillator generally does not behave in an ideal manner, and thus suffers from phase noise which is a random perturbation of the phase of a steady sinusoidal waveform. Besides, the phase noise of the practical oscillators will be imparted to the signals during the up-conversion at the transmitter and the down-conversion at the receiver. The resulting phase noise spectrum of such a frequency-shifting oscillator is a function of the properties of a free-running oscillator together with those of the components of the phase-locked loop (PLL).

The undesired phase noise introduced from the local oscillator threatens orthogonality of sub-carriers used in an OFDM system. Two effects of phase noise added to the signal by a receiver local oscillator are distinguished as a low-frequency phase noise (typically termed common phase error) and a high-frequency phase noise (typically termed inter-carrier interference). Specifically, the common phase error arises predominantly from the low-frequency components of the phase noise spectrum, and causes a rotation of the signal constellation. Regarding the inter-carrier interference, it corresponds to the summation of the information of the other sub-carriers each multiplied by some complex number which comes from an average of phase noise with a spectral shift, and appears as additive Gaussian noise to the receiver.

As mentioned above, the phase noise introduced by the practical oscillator is unavoidable. However, if the receiver has suitable ability to tackle the effects of phase noise, this can allow the system and RF engineer to relax the specification of the local oscillator used in the receiver.

SUMMARY

In accordance with exemplary embodiments of the present invention, a wireless communication receiver with phase noise estimation and phase noise compensation performed after channel estimation, and related wireless communication receiving method and phase noise compensation apparatus are proposed to solve the above-mentioned problems.

According to a first aspect of the present invention, an exemplary wireless communication receiver is disclosed. The exemplary wireless communication receiver includes a first signal processing block, a phase noise compensation apparatus, and a second signal processing block. The first signal processing block is arranged for generating a first processed output by processing a reception signal, wherein the first signal processing block includes a channel estimation unit arranged for performing channel estimation. The phase noise compensation apparatus is arranged for receiving the first processed output and generating a second processed output by performing phase noise compensation according to the received first processed output. The second signal processing block is arranged for receiving the second processed output and processing the received second processed output.

According to a second aspect of the present invention, an exemplary wireless communication receiving method is disclosed. The exemplary wireless communication receiving method includes the following steps: performing a first signal processing operation for processing a reception signal to generate a first processed output, wherein the first signal processing operation includes channel estimation; generating a second processed output by performing phase noise compensation according to the first processed output; and performing a second signal processing operation upon the second processed output.

According to a third aspect of the present invention, an exemplary phase noise compensation apparatus is disclosed. The exemplary phase noise compensation apparatus includes a common phase error estimation unit, an equalizer, and a common phase error compensation unit. The common phase error estimation unit is arranged for estimating a common phase error of an input signal. The equalizer is arranged for generating an equalized signal by equalizing the input signal. The common phase error compensation unit is arranged for performing a common phase error compensation upon the equalized signal according to the common phase error estimated by the common phase error estimation unit.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
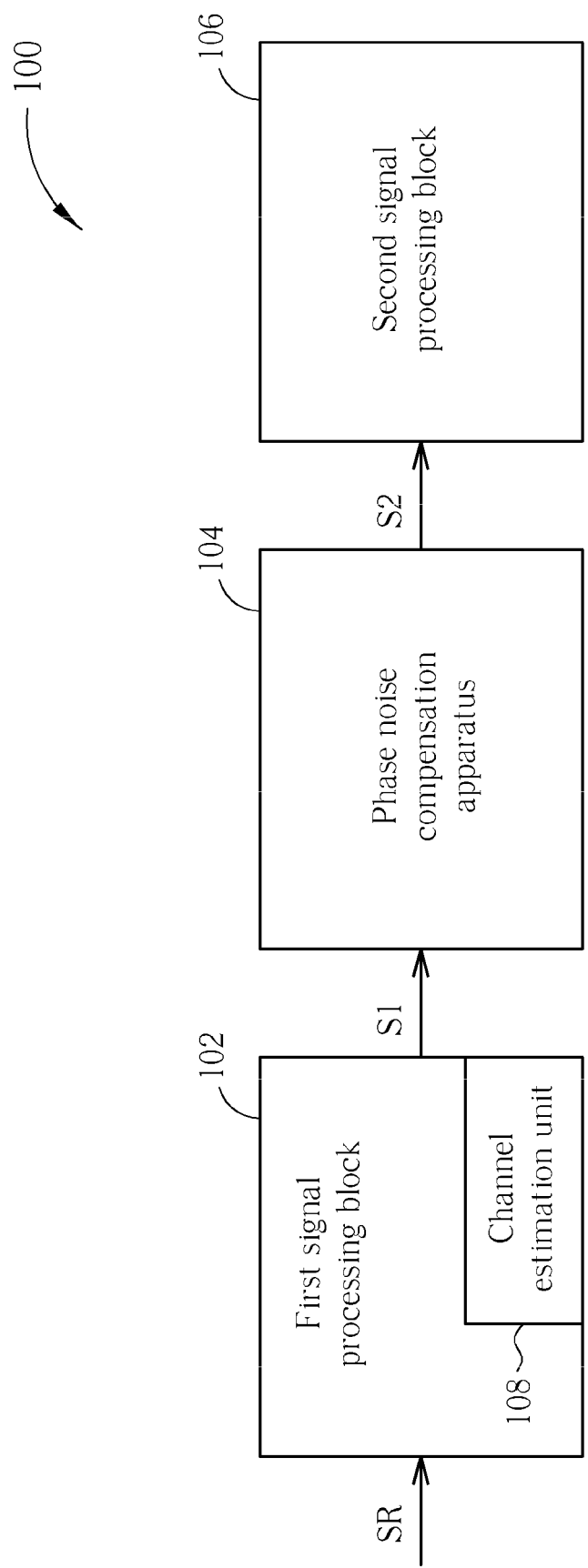
FIG. 1 is a block diagram illustrating a generalized wireless communication receiver 100 according to an exemplary embodiment of the present invention.

Please refer to FIG. 1, which is a block diagram illustrating a generalized wireless communication receiver according to an exemplary embodiment of the present invention. The wireless communication receiver 100 may be used in a DVB-T system, a DVB-T2 system, a multi-standard (including DVB-T and DVB-T2) system, an ISDB-T system, or any OFDM-based system. In this exemplary embodiment, the wireless communication receiver 100 includes, but is not limited to, a first signal processing block 102, a phase noise compensation apparatus 104, and a second signal processing block 106. The first signal processing block 102 is arranged for generating a first processed output S1 by processing a reception signal (e.g., a received RF signal) SR. The phase noise compensation apparatus 104 is coupled between the first signal processing block 102 and the second signal processing block 106, and is arranged for receiving the first processed output S1 and generating a second processed output S2 by performing phase noise compensation according to the received first processed output S1. The second signal processing block 106 is arranged for receiving the second processed output S2 and processing the received second processed output S2. For example, the second signal processing block 106 may perform error correction upon the second processed output S2. As shown in FIG. 1, the first signal processing block 102 includes a channel estimation unit 108 arranged for performing channel estimation, and the phase noise compensation apparatus 104 is placed between the preceding first signal processing block 102 and the following second signal processing block 106. Therefore, regarding a transmitted OFDM symbol, the phase noise estimation and phase noise compensation is performed after the channel estimation is accomplished. As the channel estimation result is known beforehand, the phase noise compensation may refer to the channel estimation result to remove the effects caused by the phase noise more precisely and efficiently when performed upon the first processed output S1. Further details of the phase noise compensation apparatus 104 are described hereinafter.

Figure 2:
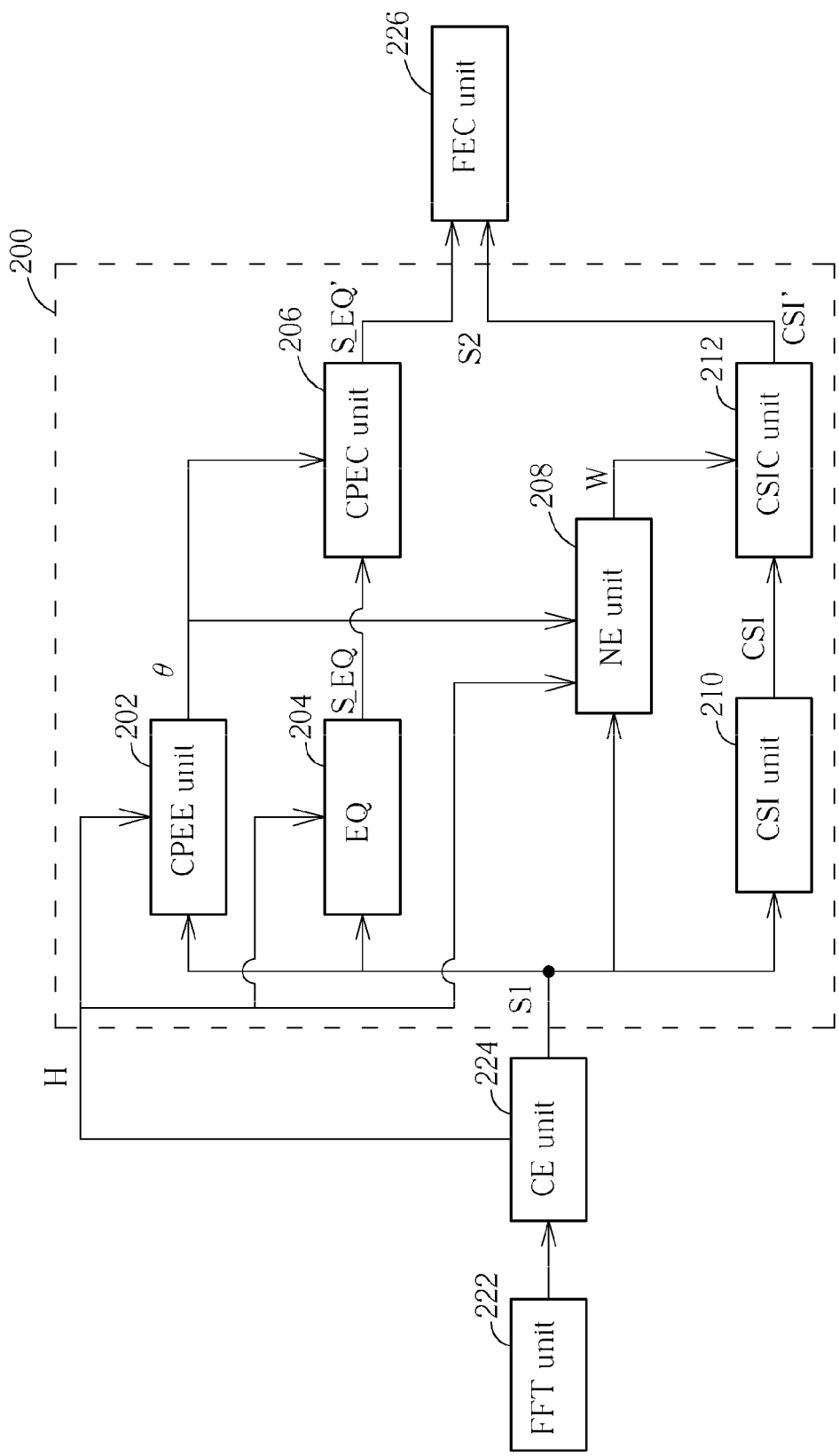
FIG. 2 is a first exemplary implementation of a phase noise compensation apparatus according to the present invention.

Please refer to FIG. 2, which is a first exemplary implementation of a phase noise compensation apparatus according to the present invention. The exemplary phase noise compensation apparatus 200 may be employed to realize the phase noise compensation apparatus 104 shown in FIG. 1. As shown in the figure, the phase noise compensation apparatus 200 includes, but is not limited to, a common phase error estimation (CPEE) unit, an equalizer (EQ) 204, a common phase error compensation (CPEC) unit 206, a noise estimation (NE) unit 208, a channel state information (CSI) unit 210, and a channel state information compensation (CSIC) unit 212. It should be noted that the Fast Fourier transform (FFT) unit 222 and the channel estimation (CE) unit 224 belong to the first signal processing block 102 shown in FIG. 1, and the forward error correction (FEC) unit 226 belongs to the second signal processing block 106 shown in FIG. 1. Therefore, the phase noise compensation apparatus 200 may be regarded as directly connected between the CE unit 224 of the first signal processing block 102 and the FEC unit 226 of the second signal processing block 106. However, the phase noise compensation apparatus 200 may be just coupled between the CE unit 224 and the FEC unit 226, and there are other devices connected between the CE unit 224 and the FEC unit 226, such as a frequency domain interleaver (not shown).

The CE unit 224 generates a channel estimation result H according to an FFT output of the FFT unit 222. The CPEE unit 202 is arranged for estimating a common phase error (e.g., θ) of the first processed output S1 according to the first processed output S1 and the channel estimation result (e.g., an estimated channel gain) H. By way of example, but not limitation, the CPEE unit 202 may use the continual pilots (CPs) of OFDM symbols included in the first processed output S1 and the corresponding estimated channel gain to estimate the common phase error. Suppose that $r_i$ represents data at a sub-carrier i, and $h_i$ represents the estimated channel gain at the sub-carrier i. The common phase error θ may be estimated using the following algorithm.

$$\text{Let } \tilde{r}_i = r_i \cdot h_i^*$$
$$\text{if } \tilde{r}_i \text{ is CP}$$
$$\{$$
$$\quad \text{if real}(\tilde{r}_i) > 0$$
$$\quad\quad \text{SUM=SUM+ } \tilde{r}_i$$
$$\quad \text{else SUM=SUM- } \tilde{r}_i$$
$$\}$$
$$\theta = a \tan 2(\text{SUM})$$

As the CP is modulated using Binary Phase Shift Keying (BPSK), the ideal value of the CP is either +1 or −1. To eliminate the effect caused by the data, a decision directed (DD) scheme is employed for comparing the real part of $\tilde{r}_i$ with 0. In this way, the common phase error would be correctly accumulated by updating the summation value SUM with $\tilde{r}_i$. Based on the summation value SUM, the common phase error θ can be easily obtained using the a tan 2 function.

It should be noted that using continual pilots to estimate the common phase error is for illustrative purposes only. In an alternative design, a more complicated algorithm may be employed for estimating the common phase error. For example, the data at a subcarrier that is modulated using a low quadrature amplitude modulation (QAM) may be used for common phase error estimation.

The equalizer 204 is arranged for generating an equalized signal S_EQ by equalizing the first processed output S1, such as an FFT output, according to the channel estimation result H. The CSI unit 210 is arranged for generating channel state information CSI according to the first processed output S1, where the channel state information CSI is indicative of the channel properties of a communication link between the transmitter and the receiver, and therefore describes the reliability of the received data. Because the constellation of EQ data is corrupted and rotated by the common phase error which may be introduced due to phase noise of the oscillator and/or the residual carrier frequency offset, performance of the receiver is poor and the channel state information is also poor. Thus, the CPEC unit 206 is arranged for performing a common phase error compensation upon the equalized signal S_EQ according to the common phase error θ estimated by the common phase error estimation unit 202. For example, the CPEC unit 206 de-rotates the constellation of EQ data by multiplying the equalized signal S_EQ with $e^{-j\theta}$, and accordingly generates compensated equalized signal S_EQ'.

It should be noted that the FEC unit 226 is arranged to perform error correction upon the EQ data according to the channel state information CSI. For example, in a case where the wireless communication system employs the low-density parity-check (LDPC) coding to ensure the data correctness, the FEC unit 226 is designed to have LDPC decoding capability, and perform LDPC decoding upon the EQ data by referring to absolute reliability data given by the channel state information. As the equalized signal S_EQ is adjusted/compensated by the CPEC unit 206, the original channel state information corresponding to the equalized signal S_EQ should be adjusted to have correct absolute reliability data fed into the FEC unit 226. In other words, the second processed output S2 generated from the phase compensation apparatus 200 includes the compensated equalized signal S_EQ' and adjusted channel state information CSI'.

Regarding the compensation applied to the channel state information CSI generated from the CSI unit 210, the NE unit 208 and the CSIC unit 212 are used. The NE unit 208 is arranged for generating a compensation parameter W corresponding to the common phase error θ, and the CSIC unit 212 is arranged for adjusting the channel state information CSI according to the compensation parameter W and accordingly outputting the adjusted channel state information CSI'. In one exemplary design, the compensation parameter W is a weighting value, and the CSIC unit 212 generates adjusted channel state information CSI' by multiplying the channel state information CSI with the weighting value W. Regarding the compensation parameter (e.g., a weighting value) W, the NE unit 208 may be configured to generate it according to the common phase error θ, the first processed output S1, and the channel estimation result H. By way of example, but not limitation, there are two methods that may be used to calculate the compensation parameter (e.g., a weighting value) W. One is a math derivation method, and the other is a noise re-estimation method. The details of these methods are described as follows.

The received signal may be modeled using following equation.

$$Y_{l,k} = e^{j\theta} H_{l,k} H_{l,k} + N_{l,k} \quad (1)$$

In above equation (1), $Y_{l,k}$ is the received signal, $e^{j\theta}$ is the common phase error, $H_{l,k}$ is the channel, $X_{l,k}$ is data or pilot, $N_{l,k}$ is noise, l is an index value corresponding to the $l^{th}$ symbol, and k is an index value corresponding to the $k^{th}$ sub-carrier. The relationship between adjusted channel state information $CSI_{l,k,after}$ and the original channel state information $CSI_{l,k,before}$ may be expressed as follows.

$$CSI_{l,k,after} = \frac{\|H_{l,k}\|^2}{\|N_{l,k}\|^2} \quad (2)$$

$$= \frac{\|H_{l,k}\|^2}{E[|N_{l,k,after}|^2]}$$

$$= \frac{\|H_{l,k}\|^2}{E[|N_{l,k,before}|^2]} \cdot \frac{E[|N_{l,k,before}|^2]}{E[|N_{l,k,after}|^2]}$$

$$= CSI_{l,k,before} \cdot W$$

When the math derivation method is employed by the NE unit 208, the compensation parameter (e.g., a weighting value) W may be calculated using following equations.

$$W = \frac{E[|N_{l,k,before}|^2]}{E[|N_{l,k,after}|^2]} \quad (3)$$

$$= \frac{E[|N_{l,k,before}|^2]}{E[|N_{l,k,before}|^2] - A}$$

$$A = E\left[\frac{1}{K}|e^{j\theta} - 1|^2 |\tilde{H}_{l,k}|^2 |X_{l,k}|^2\right], \quad (4)$$

where K is a constant

When the noise re-estimation method is employed by the NE unit 208, the compensation parameter (e.g., a weighting value) W may be calculated using following equations.

$$W = \frac{E[|N_{l,k,before}|^2]}{E[|N_{l,k,after}|^2]} \quad (5)$$

$$E[|N_{l,k,before}|^2] = E[|Y_{l,k} - H_{l,k} X_{l,k}|^2] \quad (6)$$

$$E[|N_{l,k,after}|^2] = E[|Y_{l,k} e^{-j\theta} - H_{l,k} X_{l,k}|^2] \quad (7)$$

or $$E[|Y_{l,k} - e^{j\theta} H_{l,k} X_{l,k}|^2]$$

As mentioned above, the FEC unit 226 performs error correction upon the EQ data according to the channel state information. Consider another case where the wireless communication system employs the Viterbi coding to ensure the data correctness. Thus, the FEC unit 226 is designed to have Viterbi decoding capability, and perform Viterbi decoding upon the EQ data by referring to relative reliability data instead of absolute reliability data. As the equalized signal S_EQ is adjusted/compensated by the same common phase compensation (e.g., $e^{-j\theta}$), the relative reliability data given by the channel state information CSI corresponding to the equalized signal S_EQ is not affected by the common phase compensation applied to the equalized signal S_EQ. Therefore, when the FEC unit 226 is designed to perform Viterbi decoding upon the EQ data by referring to relative reliability data, the aforementioned operation of adjusting/compensating the channel state information CSI may be omitted.

Figure 3:
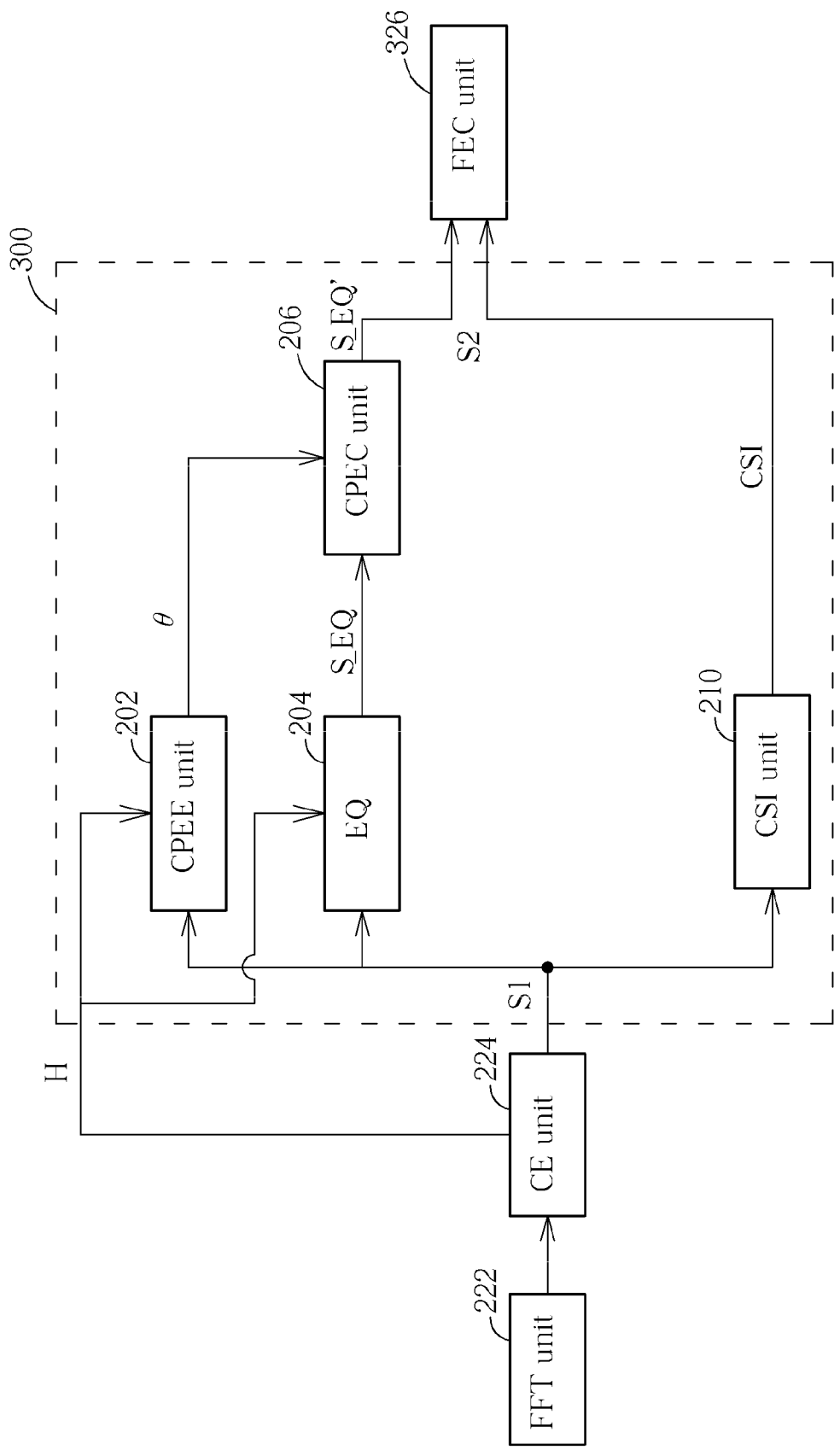
FIG. 3 is a second exemplary implementation of a phase noise compensation apparatus according to the present invention.

Please refer to FIG. 3, which is a second exemplary implementation of a phase noise compensation apparatus according to the present invention. The exemplary phase noise compensation apparatus 300 may be employed to realize the phase noise compensation apparatus 104 shown in FIG. 1. The major difference between the phase noise compensation apparatuses 200 and 300 is that the CSI unit 210 of the phase noise compensation apparatus 300 outputs the channel state information CSI to the following FEC unit 326 directly. To put it another way, the second processed output S2 generated from the phase noise compensation apparatus 300 includes the compensated equalized signal S_EQ' and the unadjusted/uncompensated channel state information CSI. As a person skilled in the art can readily understand operation of the phase noise compensation apparatus 300 after reading above paragraphs, further description is omitted here for brevity.

In above-mentioned embodiments, the phase noise compensation apparatus 200/300 is coupled between the CE unit 224 and FEC unit 226 (e.g., directly connected or indirectly connected between the CE unit 224 and FEC unit 226). However, this is for illustrative purposes only, and is not meant to be a limitation of the present invention. For example, a wireless communication receiver falls within the scope of the present invention as long as the circuit configuration of the phase noise compensation apparatus 200/300 is employed by the wireless communication receiver. For example, the first processed output S1 may not be required to be outputted from the first signal processing block 102 immediately after the channel estimation is accomplished, and/or the second processed output S2 outputted from the phase noise compensation apparatus may not be immediately used by the forward error correction.

To put it simply, in accordance with the exemplary embodiments shown in FIG. 2 and FIG. 3, the present invention proposes a phase noise compensation apparatus, which includes a common phase error estimation unit arranged for estimating a common phase error of an input signal (e.g., the aforementioned first processed output S1 or any input which can be processed by the phase noise compensation apparatus for common phase error estimation), an equalizer arranged for generating an equalized signal by equalizing the input signal, and a common phase error compensation unit arranged for performing a common phase error compensation upon the equalized signal according to the common phase error estimated by the common phase error estimation unit. Thus, any wireless communication receiver that estimates the common phase error according to an input of the equalizer and applies the common phase error compensation to an output of the equalizer falls within the scope of the present invention. Moreover, based on the actual error correction scheme employed by the wireless communication system, the proposed phase noise compensation apparatus may further include a noise estimation unit arranged for generating a compensation parameter corresponding to the common phase error, a channel state information unit arranged for generating channel state information according to the input signal, and a channel state information compensation unit arranged for adjusting the channel state information according to the compensation parameter.

As can be seen from FIG. 2 and FIG. 3, the exemplary phase noise compensation apparatus 200/300 is configured to perform compensation upon EQ data and/or channel state information. In other words, the exemplary phase noise compensation apparatus of the present invention performs both of the phase noise estimation and the phase noise compensation in the frequency domain. In other words, the exemplary phase noise compensation apparatus of the present invention neither estimates the phase noise and performs the phase noise compensation within each of a plurality of time periods in the time domain, nor iteratively estimates the phase noise in the frequency domain and performs the corresponding phase noise compensation in the time domain. Thus, the phase noise can be easily estimated, and the phase noise compensation can be easily realized. Besides, as the phase noise estimation and phase noise compensation is performed after the channel estimation is accomplished, the exemplary phase noise compensation apparatus of the present invention knows the channel estimation result beforehand, and may refer to the channel estimation result to remove the effects caused by the phase noise more precisely and efficiently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication receiver, comprising:
a first signal processing block, configured to generate a first processed output by processing a reception signal, wherein the first signal processing block includes a channel estimation unit configured to perform channel estimation;
a phase noise compensation apparatus, configured to receive the first processed output, and generate a second processed output by performing phase noise compensation according to the received first processed output and adjusting channel state information according to the phase noise compensation, wherein the second processed output includes phase noise compensated data and adjusted channel state information; and
a second signal processing block, configured to receive the second processed output and process the received second processed output, wherein the second signal processing block includes a forward error correction unit configured to refer to the adjusted channel state information for performing forward error correction upon the phase noise compensated data.

2. The wireless communication receiver of claim 1, wherein the phase noise compensation apparatus is coupled between the channel estimation unit and the forward error correction unit.

3. The wireless communication receiver of claim 2, wherein the phase noise compensation apparatus comprises:
a common phase error estimation unit, configured to estimate a common phase error of the first processed output according to the first processed output and a channel estimation result generated from the channel estimation unit;
an equalizer, configured to generate an equalized signal by equalizing the first processed output according to the channel estimation result; and
a common phase error compensation unit, configured to perform a common phase error compensation upon the equalized signal according to the common phase error estimated by the common phase error estimation unit.

4. The wireless communication receiver of claim 3, wherein the phase noise compensation apparatus further comprises:
a noise estimation unit, configure to generate a compensation parameter corresponding to the common phase error;
a channel state information unit, configured to generate the channel state information according to the first processed output; and
a channel state information compensation unit, configured to adjust the channel state information according to the compensation parameter.

5. The wireless communication receiver of claim 4, wherein the noise estimation unit is configured to generate the compensation parameter according to the common phase error, the first processed output, and the channel estimation result.

6. The wireless communication receiver of claim 4, wherein the compensation parameter is a weighting value, and the channel state information compensation unit is configured to generate adjusted channel state information by multiplying the channel state information with the weighting value.

7. The wireless communication receiver of claim 1, wherein the phase noise compensation apparatus comprises:
a common phase error estimation unit, configured to estimate a common phase error of the first processed output;
an equalizer, configured to generate an equalized signal by equalizing the first processed output; and
a common phase error compensation unit, configured to perform a common phase error compensation upon the equalized signal according to the common phase error estimated by the common phase error estimation unit.

8. The wireless communication receiver of claim 7, wherein the phase noise compensation apparatus further comprises:
a noise estimation unit, configured to generate a compensation parameter corresponding to the common phase error;
a channel state information unit, configured to generate the channel state information according to the first processed output; and
a channel state information compensation unit, configured to adjust the channel state information according to the compensation parameter.

9. The wireless communication receiver of claim 8, wherein the compensation parameter is a weighting value, and the channel state information compensation unit is configured to generate adjusted channel state information by multiplying the channel state information with the weighting value.

10. A wireless communication receiving method, comprising:
performing a first signal processing operation for processing a reception signal to generate a first processed output, wherein the first signal processing operation includes channel estimation;
generating a second processed output by performing phase noise compensation according to the first processed output and adjusting channel state information according to the phase noise compensation, wherein the second processed output includes phase noise compensated data and adjusted channel state information; and
performing a second signal processing operation upon the second processed output, wherein the second signal processing operation includes referring to the adjusted channel state information to perform forward error correction upon the phase noise compensated data.

11. The wireless communication receiving method of claim 10, wherein a channel estimation result generated from the channel estimation is directly used by the phase noise compensation, and the second processed output is directly used by the forward error correction.

12. The wireless communication receiving method of claim 11, wherein the phase noise compensation comprises:
estimating a common phase error according to the first processed output and the channel estimation result;
generating an equalized signal by equalizing the first processed output according to the channel estimation result; and
performing a common phase error compensation upon the equalized signal according to the estimated common phase error.

13. The wireless communication receiving method of claim 12, wherein the step of adjusting the channel state information according to the phase noise compensation comprises:
generating a compensation parameter corresponding to the common phase error;
generating the channel state information according to the first processed output; and
adjusting the channel state information according to the compensation parameter.

14. The wireless communication receiving method of claim 13, wherein the step of generating the compensation parameter comprises:
generating the compensation parameter according to the common phase error, the first processed output, and the channel estimation result.

15. The wireless communication receiving method of claim 13, wherein the compensation parameter is a weighting value, and the step of adjusting the channel state information comprises:
generating adjusted channel state information by multiplying the channel state information with the weighting value.

16. The wireless communication receiving method of claim 10, wherein the phase noise compensation comprises:
estimating a common phase error of the first processed output;
generating an equalized signal by equalizing the first processed output; and
performing a common phase error compensation upon the equalized signal according to the estimated common phase error.

17. The wireless communication receiving method of claim 16, wherein the step of adjusting the channel state information according to the phase noise compensation comprises:
generating a compensation parameter corresponding to the common phase error;
generating the channel state information according to the first processed output; and
adjusting the channel state information according to the compensation parameter.

18. The wireless communication receiving method of claim 17, wherein the compensation parameter is a weighting value, and the step of adjusting the channel state information comprises:
generating adjusted channel state information by multiplying the channel state information with the weighting value.

19. A phase noise compensation apparatus, comprising:
a common phase error estimation unit, configured to estimate a common phase error of an input signal;
an equalizer, configured to generate an equalized signal by equalizing the input signal;
a common phase error compensation unit, configured to perform a common phase error compensation upon the equalized signal according to the common phase error estimated by the common phase error estimation unit;
a noise estimation unit, configured to generate a compensation parameter corresponding to the common phase error;
a channel state information unit, configured to generate channel state information according to the input signal; and
a channel state information compensation unit, configured to adjust the channel state information according to the compensation parameter.

20. A wireless communication receiver, comprising:
a first signal processing block, configured to generate a first processed output by processing a reception signal, wherein the first signal processing block includes a channel estimation unit configured to perform channel estimation;
a phase noise compensation apparatus, configured to receive the first processed output, and generate a second processed output by performing phase noise compensation according to the received first processed output and adjusting channel state information according to the phase noise compensation; and
a second signal processing block, configured to receive the second processed output and process the received second processed output;
wherein the second signal processing block includes a forward error correction unit, and the phase noise compensation apparatus is coupled between the channel estimation unit and the forward error correction unit;
wherein the phase noise compensation apparatus comprises:
a common phase error estimation unit, configured to estimate a common phase error of the first processed output according to the first processed output and a channel estimation result generated from the channel estimation unit;
an equalizer, configured to generate an equalized signal by equalizing the first processed output according to the channel estimation result;

a common phase error compensation unit, configured to perform a common phase error compensation upon the equalized signal according to the common phase error estimated by the common phase error estimation unit;

a noise estimation unit, configure to generate a compensation parameter corresponding to the common phase error;

a channel state information unit, configured to generate the channel state information according to the first processed output; and a channel state information compensation unit, configured to adjust the channel state information according to the compensation parameter.

21. A wireless communication receiver, comprising:

a first signal processing block, configured to generate a first processed output by processing a reception signal, wherein the first signal processing block includes a channel estimation unit configured to perform channel estimation;

a phase noise compensation apparatus, configured to receive the first processed output, and generate a second processed output by performing phase noise compensation according to the received first processed output and adjusting channel state information according to the phase noise compensation; and a second signal processing block, configured to receive the second processed output and process the received second processed output;

wherein the phase noise compensation apparatus comprises:

a common phase error estimation unit, configured to estimate a common phase error of the first processed output;

an equalizer, configured to generate an equalized signal by equalizing the first processed output;

a common phase error compensation unit, configured to perform a common phase error compensation upon the equalized signal according to the common phase error estimated by the common phase error estimation unit;

a noise estimation unit, configured to generate a compensation parameter corresponding to the common phase error;

a channel state information unit, configured to generate the channel state information according to the first processed output; and a channel state information compensation unit, configured to adjust the channel state information according to the compensation parameter.

22. A wireless communication receiving method, comprising:

performing a first signal processing operation for processing a reception signal to generate a first processed output, wherein the first signal processing operation includes channel estimation;

generating a second processed output by performing phase noise compensation according to the first processed output and adjusting channel state information according to the phase noise compensation; and performing a second signal processing operation upon the second processed output;

wherein the second signal processing operation includes forward error correction, a channel estimation result generated from the channel estimation is directly used by the phase noise compensation, and the second processed output is directly used by the forward error correction;

wherein the phase noise compensation comprises:

estimating a common phase error according to the first processed output and the channel estimation result;

generating an equalized signal by equalizing the first processed output according to the channel estimation result; and performing a common phase error compensation upon the equalized signal according to the estimated common phase error;

wherein the step of adjusting the channel state information according to the phase noise compensation comprises:

generating a compensation parameter corresponding to the common phase error;

generating the channel state information according to the first processed output; and adjusting the channel state information according to the compensation parameter.

23. A wireless communication receiving method, comprising:

performing a first signal processing operation for processing a reception signal to generate a first processed output, wherein the first signal processing operation includes channel estimation;

generating a second processed output by performing phase noise compensation according to the first processed output and adjusting channel state information according to the phase noise compensation; and performing a second signal processing operation upon the second processed output;

wherein the phase noise compensation comprises:

estimating a common phase error of the first processed output;

generating an equalized signal by equalizing the first processed output; and performing a common phase error compensation upon the equalized signal according to the estimated common phase error;

wherein the step of adjusting the channel state information according to the phase noise compensation comprises:

generating a compensation parameter corresponding to the common phase error;

generating the channel state information according to the first processed output; and adjusting the channel state information according to the compensation parameter.

* * * * *